United States Patent
Sim et al.

(10) Patent No.: US 10,889,345 B2
(45) Date of Patent: Jan. 12, 2021

(54) APPARATUS FOR ATTACHING VEHICLE BODY AND TRANSFER DEVICE HAVING THE SAME

(71) Applicants: HYUNDAI MOTOR COMPANY, Seoul (KR); KIA MOTORS CORPORATION, Seoul (KR)

(72) Inventors: Minsun Sim, Incheon (KR); Ki Soon Kim, Ulsani (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 388 days.

(21) Appl. No.: 15/601,232

(22) Filed: May 22, 2017

(65) Prior Publication Data
US 2018/0154964 A1     Jun. 7, 2018

(30) Foreign Application Priority Data
Dec. 7, 2016   (KR) .......................... 10-2016-0165935

(51) Int. Cl.
*B62D 65/18*     (2006.01)
(52) U.S. Cl.
CPC ...... *B62D 65/18* (2013.01); *B65G 2201/0294* (2013.01)
(58) Field of Classification Search
CPC ........ B62D 65/18; B65G 39/14; B65G 39/00; B65G 39/02; B65G 13/12; B65G 17/20; B23Q 1/40; B23Q 7/05; F16M 2200/044
USPC .... 269/289 R, 289 MR, 71, 254 CS; 193/37, 193/35 B; 198/678.1, 682, 465.4
See application file for complete search history.

(56) References Cited

U.S. PATENT DOCUMENTS

| | | | | | |
|---|---|---|---|---|---|
| 1,970,840 | A | * | 8/1934 | Cardwell | F16L 1/06 248/55 |
| 2,236,029 | A | * | 3/1941 | Smith | B65G 13/12 193/35 B |
| 2,422,430 | A | * | 6/1947 | Manderscheid | B24B 5/35 451/338 |
| 2,826,290 | A | * | 3/1958 | Barski | B65G 21/14 198/812 |

(Continued)

OTHER PUBLICATIONS

McKeen, Laurence W.. (2012). Permeability Properties of Plastics and Elastomers (3rd Edition)—12.14 Acrylonitrile-Butadiene Copolymer (NBR). Elsevier. Retrieved from https://app.knovel.com/hotlink/pdf/id:kt009IL5W6/permeability-properties/acrylonitrile-butadiene (Year: 2012).*

*Primary Examiner* — Orlando E Aviles
*Assistant Examiner* — Mahdi H Nejad
(74) *Attorney, Agent, or Firm* — Morgan, Lewis & Bockius LLP

(57) ABSTRACT

An attachment apparatus for a vehicle body includes: a first roller rotatably disposed at a first hinge at one side of upper portion of a moving body and moving up and down with respect to a first fixing body; a link rotatably disposed with reference to the first hinge and extending to both directions; a second roller rotatably disposed at a second hinge at one end portion of the link and disposed at one side of the first roller; and a first elastic member disposed to elastically pull or push another end portion of the link so that the second hinge rotates with reference to the first hinge, wherein the first and second rollers respectively contact with a surface of the vehicle body.

10 Claims, 5 Drawing Sheets

(56) References Cited

U.S. PATENT DOCUMENTS

| | | | | |
|---|---|---|---|---|
| 3,918,697 | A | * | 11/1975 | Gregory ............. B23K 37/0538 |
| | | | | 269/289 R |
| 4,341,161 | A | * | 7/1982 | Morita ................... B62D 65/18 |
| | | | | 104/172.4 |
| 4,408,539 | A | * | 10/1983 | Wakabayashi ............ B61B 3/00 |
| | | | | 104/172.4 |
| 4,464,998 | A | * | 8/1984 | Wakabayashi ......... B62D 65/18 |
| | | | | 104/172.4 |
| 5,568,857 | A | * | 10/1996 | Chen ...................... B65G 13/12 |
| | | | | 198/581 |
| 2001/0045341 | A1 | * | 11/2001 | Patrito ................... B62D 65/18 |
| | | | | 198/346.2 |
| 2002/0175053 | A1 | * | 11/2002 | Minamikawa ......... B62D 65/18 |
| | | | | 198/680 |
| 2003/0000413 | A1 | * | 1/2003 | Arai ....................... B61B 10/02 |
| | | | | 104/89 |
| 2008/0077276 | A1 | * | 3/2008 | Montero Sanjuan .... B21J 15/14 |
| | | | | 700/245 |
| 2009/0193998 | A1 | * | 8/2009 | Nishihara ................. B61B 3/02 |
| | | | | 104/91 |
| 2010/0316477 | A1 | * | 12/2010 | Choi ...................... B62D 65/18 |
| | | | | 414/749.1 |
| 2011/0067364 | A1 | * | 3/2011 | Cousins ................. B29C 55/06 |
| | | | | 53/556 |
| 2011/0101192 | A1 | * | 5/2011 | Lee ....................... F16C 11/106 |
| | | | | 248/346.03 |
| 2013/0199284 | A1 | * | 8/2013 | Clusserath .......... G01M 17/007 |
| | | | | 73/116.01 |
| 2019/0210728 | A1 | * | 7/2019 | Pfau ......................... B60P 7/13 |
| 2020/0102150 | A1 | * | 4/2020 | Han ..................... G05B 19/124 |

* cited by examiner

APPARATUS FOR ATTACHING VEHICLE BODY AND TRANSFER DEVICE HAVING THE SAME

CROSS-REFERENCE TO RELATED APPLICATION

This application claims the benefit of priority to Korean Patent Application No. 10-2016-0165935 filed in the Korean Intellectual Property Office on Dec. 7, 2016, the entire content of which is incorporated herein by reference.

TECHNICAL FIELD

The present disclosure relates to a transfer device for assembling a vehicle body which is able to transfer a vehicle side assembly having various shapes according to various types of vehicles.

BACKGROUND

In a general assembly line of vehicles, a vehicle body is loaded on an attachment on an overhead conveyer and transferred to the assembly line for mounting various types of devices and components such as an engine and a transmission on the vehicle body.

A conveyance hanger, which is a conventional vehicle body transfer system, has an arm combined in a lower direction to four edges of an upper frame on which a roller is attached, and the attachment for a vehicle body is attached on a lower end of the arm in an inside to have a symmetry shape.

Such an attachment has shapes corresponding to vehicle bodies of respective vehicle types. Further, separate attachments having different shapes according to vehicle types have been used according to the vehicle types and sizes.

When the conventional attachment for different types of vehicles is used, a section matching to a vehicle body shape of the respective vehicle type needs to be made and utilized at one attachment. Otherwise, the vehicle can leave from the conveyance hanger if the vehicle is not loaded correctly.

When the attachment is remodeled or made again, the conventional vehicle type must be tried out again, and therefore, there is undesirable cost and time being used and quality and accuracy is deteriorated to have low productivity.

Further, as many vehicles have been used for public use more complicated assembly lines and separate lines are required for security purposes, investment cost is taken excessively by vehicle type transfer and control system.

Here, since the separate attachment and unit need to be used according to each vehicle type, the entire equipment becomes larger and complex and the entire equipment space becomes larger thus interfering with original equipment. Further, it is difficult to apply to a necessary process by welding and equipment interference.

With this, a weight increase and safety and quality problems occur and the cost may increase since a separate attachment needs to be used according to each vehicle type.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide an attachment apparatus on which various components are seated without vehicle transforming device having separate power source and a transfer device that is able to transfer the seated components by having the same.

An attachment apparatus for a vehicle body according to an exemplary embodiment of the present disclosure includes: a first roller rotatably disposed at a first hinge at one side of an upper portion of a moving body and moving up and down with respect to a first fixing body; a link rotatably disposed with reference to the first hinge and extending to both directions; a second roller rotatably disposed at a second hinge at one end portion of the link and disposed at one side of the first roller; and a first elastic member disposed to elastically pull or push another end portion of the link so that the second hinge rotates with reference to the first hinge, wherein the first and second rollers contact with a surface of a vehicle body.

The attachment apparatus may further include a third roller rotatably disposed at a third hinge on another side of upper portion of the moving body and contacting with the surface of the vehicle body.

The first and third rollers may be disposed to contact with a lower surface of the vehicle body, and the second roller may be disposed to contact with a side surface of the vehicle body.

The second and third hinges may be disposed side by side with the first hinge.

Outer circumference surfaces of the first, second and third rollers may be made of an acrylonitrile butadiene rubber (NBR).

The attachment apparatus may further include a second elastic member elastically supporting the moving body toward upper side portion of the first fixing body.

The second hinge may be disposed at one end portion of the link with reference to the first hinge, and the first elastic member may pull another end portion of the link toward a lower side portion.

An attachment apparatus for a vehicle body according to another exemplary embodiment of the present disclosure includes: a first swing arm of which a lower portion of a center portion is rotatably disposed on a second fixing body with reference to a fourth hinge; a second swing arm rotatably disposed at one end portion of the first swing arm with reference to a fifth hinge; and a third swing arm rotatably disposed at other end portion of the first swing arm with reference to a sixth hinge, wherein upper surfaces of the second and third swing arms contact with a lower surface of a vehicle body.

A rubber member may be formed on the upper surfaces of the second and third swing arms.

The second and third swing arms may be rotatably disposed at the first swing arm by a predetermined angle range so that upper surface of the second and third swing arms face upwards.

A transfer device for transferring a vehicle body according to still another exemplary embodiment of the present disclosure includes an attachment apparatus; an arm at one end portion of which the attachment is disposed; a rotation shaft connected with other end portion of the arm and rotating the arm; and a frame on which the rotation shaft is rotatably disposed. The attachment apparatus includes: a first roller rotatably disposed at a first hinge at one side of an upper portion of a moving body, the first roller moving up and down with respect to a first fixing body; a link rotatably disposed with reference to the first hinge and extending to both directions; a second roller rotatably disposed at a second hinge at one end portion of the link and disposed at one side of the first roller; and a first elastic member disposed to elastically pull or push another end portion of the link so that the second hinge rotates with reference to the first hinge, wherein the first and second rollers can contact with the vehicle body A transfer device for transferring a vehicle body according to yet another exemplary embodiment of the present disclosure includes an attachment apparatus; an arm at one end portion of which the attachment is disposed; a rotation shaft connected with other end portion of the arm and rotating the arm; and a frame on which the rotation shaft is rotatably disposed. The attachment apparatus includes: a first swing arm of which a lower portion of a center portion is rotatably disposed on a second fixing body with reference to a fourth hinge; a second swing arm rotatably disposed at one end portion of the first swing arm with reference to a fifth hinge; and a third swing arm rotatably disposed at another end portion of the first swing arm with reference to a sixth hinge, wherein upper surfaces of the second and third swing arms can contact with a lower surface of the vehicle body.

According to the present disclosure to achieve this purpose, the attachment apparatus for a vehicle body may support a vehicle side assembly having more various shapes and transfer by moving the second roller in a width direction through the link and the elastic member.

Further, the second roller can contact elastically with side surface of the vehicle side assembly by the first elastic member to prevent the vehicle side assembly from moving in a horizontal direction and reduce shock applied to the vehicle side assembly.

Further, when an edge of the vehicle side assembly is seated on the first, second and third rollers, the second elastic member may reduce vertical shock applied on the vehicle side assembly.

DETAILED DESCRIPTION OF THE EMBODIMENTS

Figure 1:
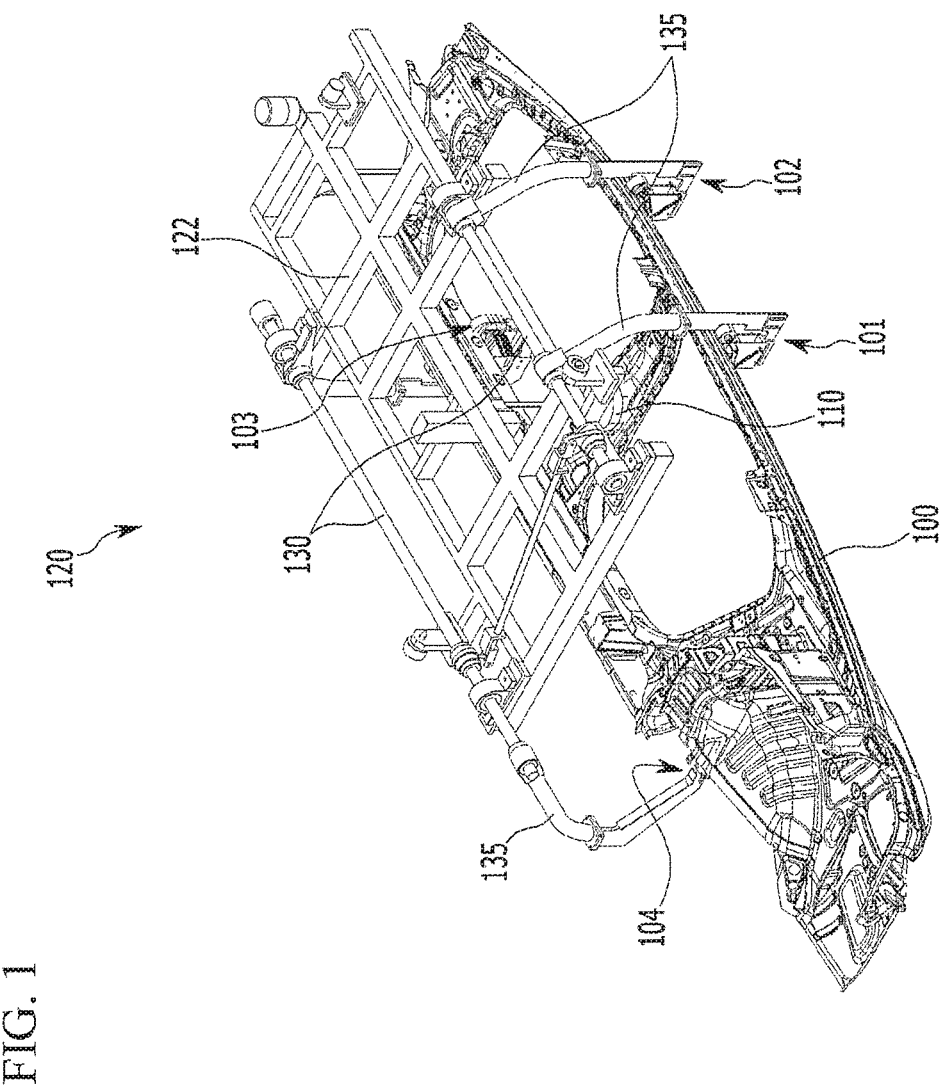
FIG. 1 is a schematic diagram of a transfer device for transferring a vehicle body according to an exemplary embodiment of the present disclosure.

Embodiments of the present disclosure will hereinafter be described in detail with reference to the accompanying drawings.

In the drawings, size and thickness of each element is approximately shown for better understanding and ease of description. Therefore, the present disclosure is not limited to the drawings, and the thicknesses of layers, films, panels, regions, etc., are exaggerated for clarity.

However, the drawings and description are to be regarded as illustrative in nature and not restrictive. Like reference numerals designate like elements throughout the specification.

The terms "first", "second" etc. in the following description is for discriminating the configurations because the names are the same and the present disclosure is not limited to the order.

FIG. 1 is a schematic diagram of a transfer device according to an exemplary embodiment of the present disclosure.

Referring to FIG. 1, a transfer device 120 includes a frame 122, a rotation shaft 130, an arm 135, a first attachment 101, a second attachment 102, a third attachment 103, a fourth attachment 104, a pusher 110, and a side assembly 100.

A plurality of rotation shafts 130 are disposed side by side on both upper sides of the frame 122 and rotatably disposed in a predetermined angle range by a torque source (not shown).

The arm 135 is engaged to both end portions of the rotation shafts 130 and is disposed at one side of the transfer device 120, and the first and second attachments 101 and 102 are mounted on a lower end portion of the arm 135.

Further, the third and fourth attachments 103 and 104 are mounted on the lower end portion of the arm 135 at another side of the transfer device 120.

The first, second, third, and fourth attachments 101, 102, 103 and 104 contact with lower and side surfaces of the side assembly 100 to lift the side assembly 100.

The pusher 110 is disposed at a lower portion of the frame 122, and a lower surface of the pusher 110 contacts with one side of an upper surface of the side assembly 100 to prevent the side assembly 100 from being shaken.

Figure 2:
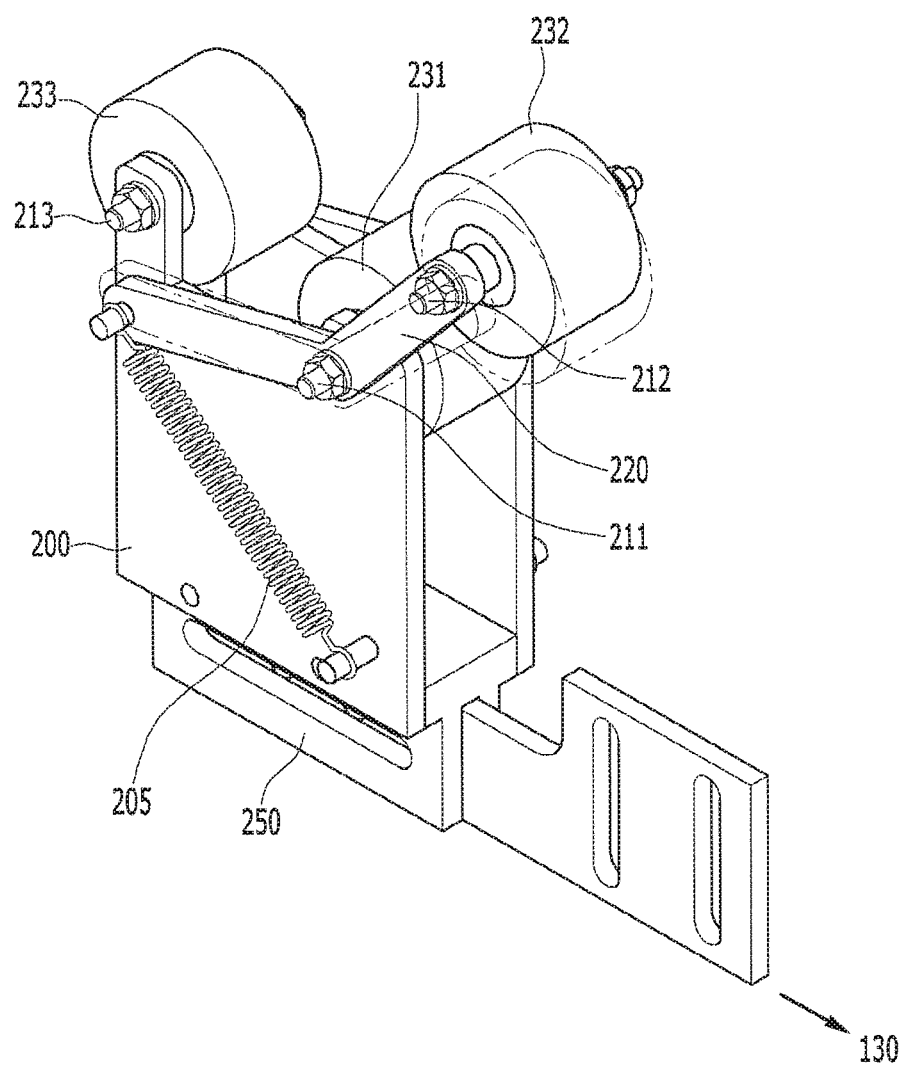
FIG. 2 is a perspective view of an attachment apparatus for a vehicle body included in a transfer device according to an exemplary embodiment of the present disclosure.

FIG. 2 is a perspective view of an attachment included in a transfer device according to an exemplary embodiment of the present disclosure.

Referring to FIG. 2, each of the first and second attachments 101 and 102 includes a first fixing body 250, a moving body 200, a first elastic member 205, a first roller 231, a first hinge 211, a link 220, a second hinge 212, a second roller 232, a third hinge 213, and a third roller 233.

The moving body 200 is movably disposed up and down at the first fixing body 250, and the first roller 231 is rotatably disposed with reference to the first hinge 211 at one side of the moving body 200. Here, the first fixing body 250 is connected with the lower end portion of the arm 135.

The link 220 is connected to one side surface of the second roller 232, and a center portion of the link 220 in lengthwise direction thereof is rotatably disposed with reference to the first hinge 211.

The second hinge 212 is disposed at one end portion of the link 220, and the second roller 232 is rotatably disposed at the second hinge 212. Here, the first hinge 211 and the second hinge 212 are arranged side by side.

Another end portion of the link 220 is disposed to be pulled toward one side of a lower portion of the first attachment 101 or second attachment 102 by the first elastic member 205, and the first elastic member 205 elastically supports the link 220 so that the link 220 rotates in a counter clockwise direction in reference with the first hinge 211 on the basis of FIG. 2.

Accordingly, the first elastic member 205 moves the second roller 232 from an upper portion of the first roller 231 to alongside of the third roller 233 through the link 220.

The third hinge 213 is disposed at one side of the upper portion of the moving body 200, the third roller 233 is rotatably connected with the third hinge 213, the third hinge 213 and the first hinge 211 are disposed side by side, and the third roller 233 and the first roller 231 are disposed in a horizontal direction at a predetermined interval.

In an exemplary embodiment of the present disclosure, the second roller 232 is disposed at an upper portion of an opposite side of the third roller 233 on the basis of the first roller 231. Further, outer circumference surfaces of the first, second and third rollers may be made of NBR rubber (acrylo-Nitride butadiene rubber).

As the NBR has a strong hardness value of 28, it can be used for various vehicle components and a vehicle body may not be easily damaged.

Figure 3:
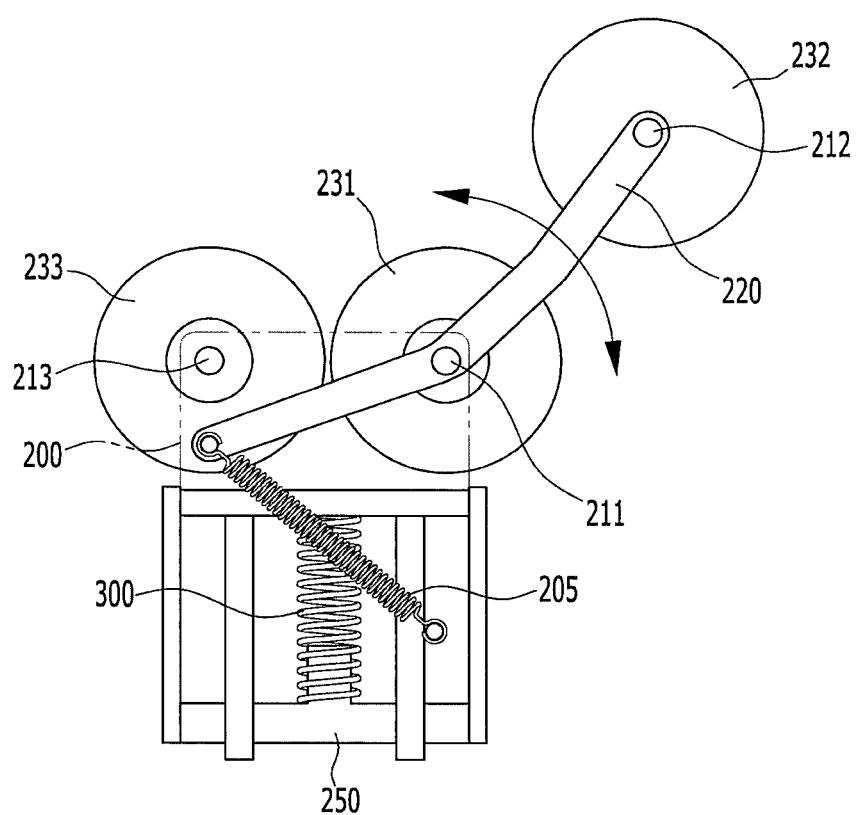
FIG. 3 is a schematic side view of an attachment apparatus for a vehicle body included in a transfer device according to an exemplary embodiment of the present disclosure.

FIG. 3 is a schematic side view of an attachment included in a transfer device according to an exemplary embodiment of the present disclosure.

Referring to FIG. 3, the moving body 200 is movably disposed up and down at the first and second attachments 101 and 102 and at the fixing body 250, and the second elastic member 300 elastically supports the moving body 200 upwards at the first fixing body 250.

The attachment apparatus according to an exemplary embodiment of the present disclosure may support the side assembly 100 having more various shapes and transfer the side assembly 100 by moving the second roller 232 in a width direction through the link 220 and the first elastic member 205.

According to an exemplary embodiment of the present disclosure, when an edge of the side assembly 100 is seated on the first, second and third rollers 231, 232 and 233, the second elastic member 300 may reduce shock applied on the side assembly 100.

Further, the second roller 232 contacts elastically with a side surface of the side assembly 100 by the first elastic member 205 to prevent the side assembly 100 from moving in a horizontal direction and reduce shock applied to the side assembly 100.

Figure 4:
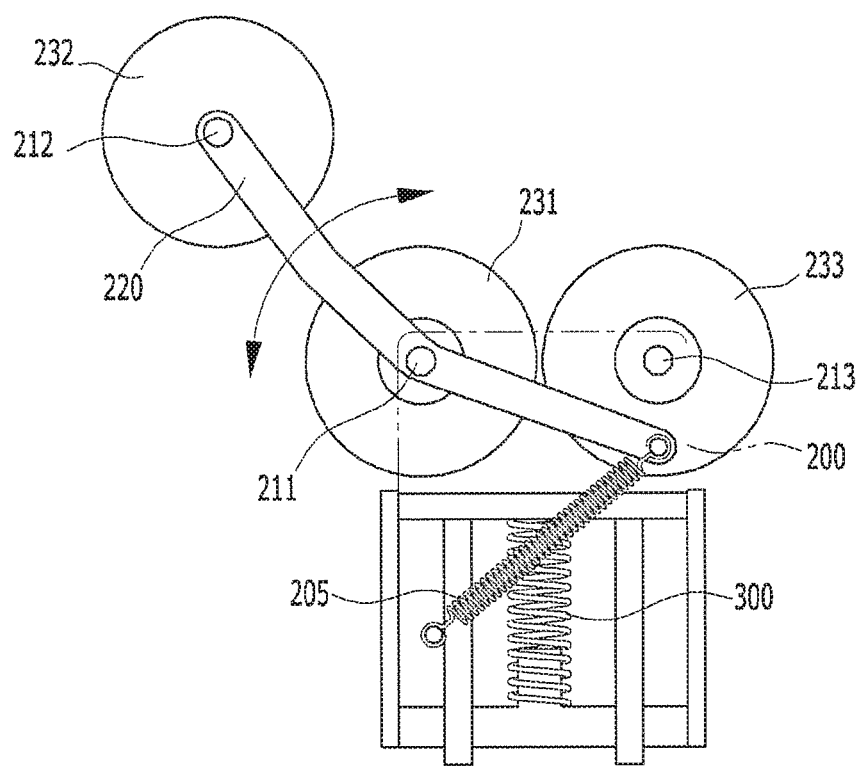
FIG. 4 is a schematic side view of an attachment apparatus for a vehicle body included in a transfer device according to an exemplary embodiment of the present disclosure.

FIG. 4 is a schematic side view of an attachment apparatus included in a transfer device according to an exemplary embodiment of the present disclosure.

Referring to FIG. 4, the arrangement of the third attachment 103 and the arrangement of the first and second attachments 101 and 102 are opposite direction each other, and constituent elements of the third attachment 103 are the same or similar with those of the first and second attachments 101 and 102, therefore detailed description will be omitted.

Figure 5:
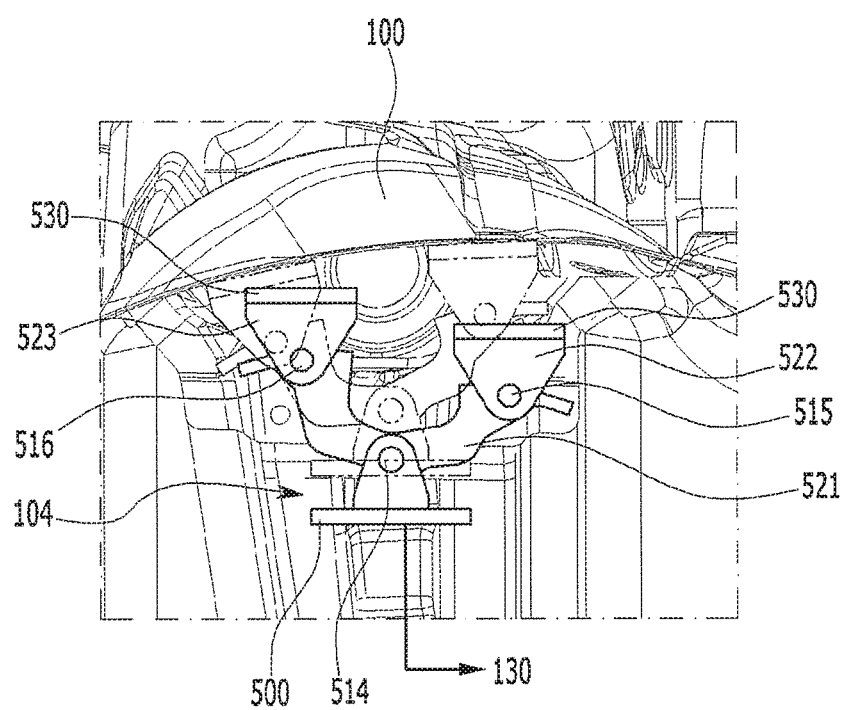
FIG. 5 is a side view of an attachment apparatus for a vehicle body and a vehicle side assembly included in a transfer device according to an exemplary embodiment of the present disclosure.

FIG. 5 is a side view of an attachment and a side assembly included in a transfer device according to an exemplary embodiment of the present disclosure.

Referring to FIG. 5, the fourth attachment 104 includes a second fixing body 500, a fourth hinge 514, a first swing arm 521, a fifth hinge 515, a second swing arm 522, a sixth hinge 516, a third swing arm 523, and a rubber member.

The second fixing body 500 is connected with the lower end portion of the arm 135, and the first swing arm 521 is rotatably disposed left and right through the fourth hinge 514. Both ends of the first swing arm 521 extend slantingly toward both sides and an upper side portion of the transfer device 120.

The second swing arm 522 and the third swing arm 523 are rotatably disposed at both end portions of the first swing arm 521 on the basis of the fifth hinge 515 and the sixth hinge 516, respectively, and the rubber member 530 is formed on upper surfaces of the second and third swing arms 522 and 523. Here, the rubber member may include hard urethane.

The upper surfaces of the second and third swing arms 522 and 523 face toward the upper side portion of the transfer device 120, and the rubber member 530 may prevent a lower surface of the side assembly 100 from being damaged and absorb shock when the upper surfaces of the second and third swing arms 522 and 523 contact with a lower surface of the side assembly 100.

The first, second, and third swing arms 521, 522 and 523 may contact with inclined portion of the side assembly 100 by rotational operation and transfer side assembly 100 having various shapes.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An attachment apparatus for a vehicle body comprising:
    a first roller rotatably disposed at a first hinge at one side of an upper portion of a moving body, the first roller moving up and down with respect to a first fixing body;
    a link rotatably disposed at the first hinge and extending in two directions from the first hinge;
    a second roller rotatably disposed at a second hinge at one end portion of the link and disposed at one side of the first roller; and
    a first elastic member connected to another end portion of the link and disposed to elastically pull or push the another end portion of the link so that the second hinge rotates with reference to the first hinge,
    wherein the first and second rollers are configured to contact with a surface of the vehicle body.

2. The attachment apparatus of claim 1, further comprising:
    a third roller rotatably disposed at a third hinge on another side of the upper portion of the moving body, the third roller configured to contact with the surface of the vehicle body.

3. The attachment apparatus of claim 2, wherein:
    the first and third rollers are configured to contact with a lower surface of the vehicle body, and
    the second roller is configured to contact with a side surface of the vehicle body.

4. The attachment apparatus of claim 2, wherein:
    the second and third hinges are disposed side by side with the first hinge.

5. The attachment apparatus of claim 2, wherein: outer circumference surfaces of the first, second, and third rollers are made of an acrylonitrile butadiene rubber (NBR).

6. The attachment apparatus of claim 2, further comprising:
    a second elastic member elastically supporting the moving body toward an upper side portion of the first fixing body.

7. The attachment apparatus of claim 2, wherein:
    the second hinge is disposed at the one end portion of the link with reference to the first hinge, and
    the first elastic member pulls the another end portion of the link toward a lower side portion of the first fixing body.

8. A transfer device for transferring a vehicle body, comprising:
    the attachment apparatus according to claim 1;

an arm at one end portion of which the attachment apparatus is disposed;
a rotation shaft connected with another end portion of the arm and rotating the arm; and
a frame on which the rotation shaft is rotatably disposed.

9. A transfer device, comprising:
the attachment apparatus according to claim 7;
an arm at one end portion of which the attachment apparatus is disposed;
a rotation shaft connected with another end portion of the arm and is configured to rotate the arm; and
a frame on which the rotation shaft is rotatably disposed.

10. A transfer device for assembling a vehicle body, comprising:
arms at each one end portions of which a first attachment apparatus and a second attachment apparatus are disposed;
rotation shafts connected with other end portions of the arms and is configured to rotate the arms respectively; and
a frame on which the rotation shafts are rotatably disposed,
wherein the first attachment apparatus includes:
a first roller rotatably disposed at a first hinge at one side of an upper portion of a moving body, the first roller moving up and down with respect to a first fixing body;
a link rotatably disposed at the first hinge and extending in two directions from the first hinge;
a second roller rotatably disposed at a second hinge at one end portion of the link and disposed at one side of the first roller; and
a first elastic member connected to the another end portion of the link and disposed to elastically pull or push another end portion of the link so that the second hinge rotates with reference to the first hinge,
wherein the first and second rollers are configured to contact with a surface of the vehicle body,
wherein the second attachment apparatus includes:
a first swing arm of which a lower portion of a center portion is rotatably disposed on a second fixing body with reference to a fourth hinge;
a second swing arm rotatably disposed at one end portion of the first swing arm with reference to a fifth hinge; and
a third swing arm rotatably disposed at another end portion of the first swing arm with reference to a sixth hinge, and
wherein upper surfaces of the second and third swing arms are configured to contact with a lower surface of the vehicle body.

* * * * *